United States Patent [19]
Collins et al.

[11] Patent Number: 5,926,567
[45] Date of Patent: Jul. 20, 1999

[54] METHOD AND APPARATUS FOR STORING AND RAPIDLY DISPLAYING GRAPHIC DATA

[75] Inventors: Roger S. Collins, Novato; John L. Friend, Pleasanton, both of Calif.

[73] Assignee: Compaq Computer Corporation, Houston, Tex.

[21] Appl. No.: 08/883,244

[22] Filed: Jun. 26, 1997

Related U.S. Application Data

[63] Continuation of application No. 08/396,539, Mar. 1, 1995, abandoned.

[51] Int. Cl.[6] .................................................. G06K 9/00
[52] U.S. Cl. ............................................ 382/187; 345/433
[58] Field of Search .................................. 382/187, 232, 382/235, 241–243, 254, 260, 274, 286, 293, 305, 190, 195, 201–203; 348/340; 345/113, 340, 342, 343, 433, 435, 501, 507, 511

[56] References Cited

U.S. PATENT DOCUMENTS

| | | | |
|---|---|---|---|
| 4,513,444 | 4/1985 | Okai | 382/242 |
| 5,363,138 | 11/1994 | Hayashi | 348/390 |
| 5,386,504 | 1/1995 | Yoda et al. | 345/340 |
| 5,430,811 | 7/1995 | Fukushima | 382/254 |
| 5,432,871 | 7/1995 | Novik | 382/232 |
| 5,434,928 | 7/1995 | Wagner | 382/187 |
| 5,555,322 | 9/1996 | Terai | 382/232 |
| 5,634,095 | 5/1997 | Wang et al. | 345/340 |
| 5,844,569 | 12/1998 | Eisler et al. | 345/433 |

*Primary Examiner*—Leo H. Boudreau
*Assistant Examiner*—Bhavesh Mehta
*Attorney, Agent, or Firm*—Fish & Neave; Jeffrey H. Ingerman; Matthew T. Byrne

[57] ABSTRACT

The present invention provides a method and apparatus for storing and rapidly yet recognizably displaying graphic data. Digital ink is sampled at a predetermined sampling frequency to derive a set of points representing the graphic data. This set of points is reduced in number in order to define an approximate yet recognizable form of the graphic data. The rapid rendering of the graphic data in its approximate form allows the user to glance through several or more fields of graphic data similar to the way in which one would flip through pages in a paper notebook. Reduction in the number of points also facilitates efficient storage of the graphic data.

90 Claims, 10 Drawing Sheets

METHOD AND APPARATUS FOR STORING AND RAPIDLY DISPLAYING GRAPHIC DATA

This is a continuation, of application Ser. No. 08/396,539, filed Mar. 1, 1995, now abandoned, entitled METHOD AND APPARATUS FOR STORING AND RAPIDLY DISPLAYING GRAPHIC DATA.

BACKGROUND OF THE INVENTION

This invention relates to the field of formatting handwritten data displayed on computer systems.

A typical computer system may include a central processing unit (CPU), main memory such as random access memory (RAM), a data-entry device including a positioning device, a mass storage device such as one or more disk drives, a display, and a printer. In previously known computers, the data-entry device has often consisted of a keyboard, which a user uses to enter data by typing. The positioning device of a previously known computer system may have consisted of a "mouse" or some other cursor-positioning device.

Computer systems have also been developed which accept handwritten data entry instead of keyboard data entry. These systems are often characterized by the use of a pen, stylus, or other writing device to enter handwritten data directly on the display of the computer system. Alternatively, these systems may provide a user with the ability to enter data on a digitizing tablet or other input device, with the image of the written input data displayed on a separate computer display or output device. The writing instrument for entering handwritten input information in the form of free-style strokes is not limited to a pen or stylus. Instead, the instrument may be any other input device such as a mouse, track-ball, pointer, or even a user's fingers. In addition, computer systems capable of accepting handwritten data are not necessarily limited to receiving data generated by human users. For example, machine-generated data may also be inputted into and accepted by such systems.

Computers in one class of handwriting-entry computer systems are referred to as "pen-based" computers. In a pen-based computer system, a writer can input information on a display by "writing" directly on the display. A writing device, such as a pen or stylus, is used to enter information on the display. In a typical pen-based computer system, a user touches the stylus to the display and writes as he or she would on a piece of paper—that is, by making a series of pen strokes to form letters or words. A resulting line or curve appears on the display, following the path of travel of the pen point so that the pen strokes appear on the display as digital "ink" just as handwritten ink would appear on a notebook page. Thus, the user can enter information into the computer by writing directly on the display. Pen-based computers typically have a display surface that serves as both an input receiving device and as an output display device.

Generally, a pen-based computer system captures digital ink in the form of many polylines. A polyline is a line or curve between the point where the tip of the stylus makes contact with the writing surface and the point where the tip of the stylus leaves the writing surface. A polyline can be described as a line between a "pen down" event to a "pen up" event; it can be viewed as a stroke. Thus, the terms "polyline" and "stroke" can be used interchangeably for purposes of this application.

The system samples points along a each handwritten stroke or polyline at a predetermined sampling frequency. Those points represent the inputted graphic data and are digitally stored in memory. The system derives an image of the graphic data by connecting the stored points with line segments. Thus, each polyline is a collection of the line segments connecting the stored points.

Pen-based computers can typically sample handwritten data at a rate of up to 200 sampled points per second. Graphic data inputted by a mouse is typically sampled at about 20 samples per second.

The number of sampled points per polyline varies inversely with the speed with which the graphic data is handwritten: the faster the handwriting, the fewer the number of sampled points per stroke or polyline; and the slower the handwriting, the greater the number of sampled points per stroke polyline. A typical page of digital ink could contain hundreds of polylines and tens of thousands of sampled points. In addition, there can be a variety of colors, line-thicknesses, and patterns represented by the ink.

A particular problem faced by a user of a pen-based computer system is the amount of time that is typically required for the system to display, upon the user's prompt, the digital ink representing the graphic data. Generally, displaying the ink can take several seconds. Waiting for the system to fully render and display the ink can often impede or interrupt the user's work flow or train of thought. Moreover, this waiting time often is simply frustrating and irritating to the user. The time that the user is forced to wait for the computer system to display graphic information can become even more annoying when the user is not actually trying to work on the data field or page being displayed, but merely trying to glance through several screens, representing fields or pages, to become familiar with their contents before settling on one particular screen, or to find a particular screen.

Most computers with handwritten data capabilities use the built-in tools of the windowing system being invoked (such as PenPoint™ from GO Corporation, of Foster City, Calif., and Microsoft Windows for Pen™ from Microsoft Corporation, of Redmond, Wash.) to draw polylines—setting pen colors and pen styles (such as thickness, shade, and fill-in) as needed.

Other systems draw, using the manner of sampling described above, into an off-screen bitmap, and then display the bitmap. These methods and devices can accommodate "instant" screen updates, but they still generally require several seconds to create a bitmap representing the graphic data.

Existing computer systems and the abovedescribed methods and devices of displaying digital ink are not well suited for allowing a user of a pen-based system to glance through data fields on the system's display as one would typically flip through pages in an actual paper notebook. Allowing the user to rapidly view the contents of selected data fields as though he or she were rapidly turning pages requires a faster method and device for storing and displaying recognizable digital ink.

Thus, it would be desirable to be able to provide a computer system capable of accepting handwritten, graphic data entry that allows the user to rapidly flip through pages of graphic data.

It would also be desirable for the system to allow the user to recognize the contents of each page being quickly flipped based on only the passing glance that the user gets of each page.

It would further be desirable for such a system to store the graphic data efficiently and thus operate free of excessive memory usage in providing the above abilities to the user.

SUMMARY OF THE INVENTION

It is an object of the present invention to allow rapid "page-flipping" in a digital "notebook," or any other product or system based on the use of digital ink, such as pen-based personal computers.

It is also an object of this invention to display pages in a recognizable fashion despite using approximate images in a rapid display or "fast-flipping" mode and quickly rendering each page upon the user's command.

It is further an object of this invention to incorporate a data-compression scheme that reduces the amount of original data to be stored by an average ratio of between about 5:1 and about 10:1 for more efficient data storage, while allowing the data to be readily recognizable without decompression.

In accordance with this invention, a method and an apparatus for storing and rapidly yet recognizably displaying graphic data is provided. The present invention encompasses a computer system that can accept handwritten, graphic data entered by a user. The present system creates an approximate rendition of the image presented by the user-inputted graphic data based on simple polylines. Then, the system checks for any available idle time during which it can start creating a full rendition of the image based on "smoothed" and "anti-aliased" curves. When the system displays the image, it will automatically display the full rendition if the full rendition is complete; otherwise, the system will display the approximate rendition.

The present system samples user-inputted graphic data at various points with a predetermined sampling rate, resulting in a set of sampled points. Using a data-compression scheme, the system filters the set of sampled points down to a reduced set of points to be retained.

Reducing the number of points to be retained facilitates efficient data storage as well as rapid display. Yet, the system can still render and display a recognizable image representing the graphic data based only on the derived set of retained points—without the system ever having to store more points than just the retained points.

In one preferred embodiment of the invention, a rapid display mode yields rough drawings based only on the compressed data (retained points), and a complete display mode yields refined drawings—also based only on the compressed data—that more closely resemble the originally inputted graphic data.

The present invention allows "pages" (or data fields) on a display to be "turned" (or viewed) at the rate of approximately five per second. Application of the data-compression scheme to reduce the set of sampled points results in a set of retained points that still provides enough visual detail to allow a user to view the pages well enough to identify the general content of each page and to locate a desired page. The above features make the system of the present invention well suited for digital ink-searching.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
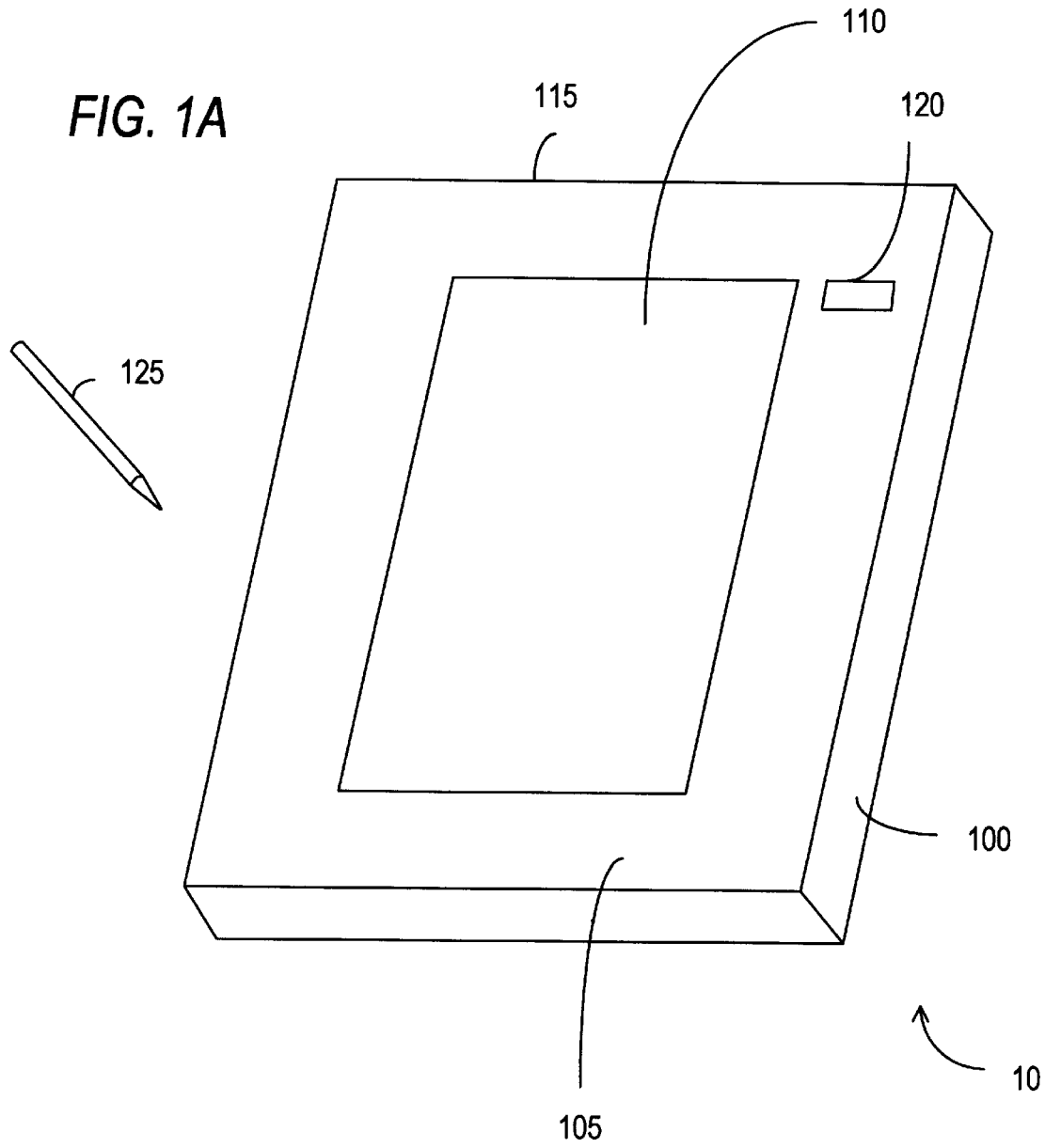
FIG. 1A is a perspective view of a handwriting-entry computer.

The present invention is a method and apparatus for storing graphic data and rapidly yet recognizably displaying selected fields of graphic data represented by digital ink.

A digitizer is provided onto which a user directly handwrites graphic data. Preferably, the digitizer is integrated into a display. Digital ink is added to a data field or "page" through the use of a data-entry device, such as a pen or a hand-held stylus in the case of a pen-based computer system. Digital ink is received from a digitizer as a series of polylines or strokes representing the graphic data. Each time the user writes on the page, more polylines are received. Preferably, the polylines forming the graphic data are sampled at a predetermined sampling frequency. The sampling process results in a set of sampled points representing the graphic data.

In the preferred embodiment, the system can accommodate typical differences in internal resolution among various types of pen-based computers. This is done by multiplying sampled data values by a scaling factor to arrive at a reference resolution. This reference resolution is set to be a multiple of the different resolutions with which the present system works.

For example, a common display resolution of a personal computer is 72 dots per inch (dpi); a typical higher resolution is 96 dpi. The present system preferably scales the sampled points to a reference resolution of 288 dpi, the lowest common multiple of 72 dpi (scaling factor of 4) and 96 dpi (scaling factor of 3). When the system receives or displays the inputted graphic data, it will respectively multiply or divide the values associated with the retained points (such as the coordinates) by the appropriate scaling factor.

Data compression begins after the sampled points are scaled. Data compression reduces the amount of storage required to store the data. During data compression, the system evaluates each sampled point for each polyline to determine whether the sampled point is needed, and thus should be retained, for creating an approximate yet readily recognizable rendition of the graphic data.

The point-compression scheme used to derive retained points from the set of sampled points for each polyline is as follows. The first sampled point and the last sampled point for each polyline are automatically retained by the system. Then, the system processes each sampled point of the polyline between the first point and the last point, iterating the same routine, to determine which of those sampled points should also be retained. In the preferred embodiment, the system iterates the routine in a programmed loop until the last point is encountered or until the number of sampled points on the polyline has expired.

In each iteration, the system locates the most recently retained point of the polyline that was sampled before the current point and beyond a minimum threshold distance from the current point. This most recently retained point will be hereinafter referred to as the "threshold" point. In the preferred embodiment, the minimum threshold distance is about 0.03 inch (about 0.0762 cm). Alternatively, the threshold distance can be dependent on the resolution of the display device.

The system considers two measurements with respect to the current point. The first measurement is the distance between the current point and the threshold point. The second measurement is the angle between (a) a line connecting the current point to the threshold point and (b) a horizontal or vertical reference line. The system also considers the last-measured angle derived from the previous iteration (performed to determine whether the previous sampled point should be retained).

The current point is retained if either of the following two conditions is satisfied: (1) there is a sufficient linear distance between the current point and the threshold point; and (2) there is a sufficient angular difference between the current angle and the last-measured angle. The minimum sufficient linear distance is preferably about 0.40 inch (about 1.016 cm) and the minimum sufficient angular difference is preferably about 30°.

When the current iteration is performed for the second sampled point on a polyline, the value of the last-measured angle is undefined because there was no threshold point with respect to the first sampled point to define a line segment with the first sampled point to form an angle with a horizontal or vertical reference line. For this reason, the value of the last-measured angle is preferably defined as zero when the current point is the second sampled point. Alternatively, the system can be made to consider a last-measured angle only for the third or subsequent sampled point of a polyline.

In addition to retaining a point when the aforementioned conditions are satisfied, if the difference between the current angle and the last-measured angle exceeds an angular threshold, then both the immediately previous sampled point and the next sampled point are retained in addition to the current point. Thus, the system does not discard a particular sampled point before the following sampled point has been processed, even if, for that particular sampled point, the process would otherwise have resulted in it being discarded. It has been empirically determined that the angular threshold for retaining the previous and next points is preferably about 45°.

Thus, in the preferred embodiment, if the angular difference exceeds 45°, then the system retains both the previous and next points in addition to the current point. Under these circumstances, some redundant processing may occur when the system iterates the process for the next point, because the system has already determined earlier that the next point should be retained. In the alternative, the system can be programmed to skip a portion of the processing relative to the next point if the system has already retained the next point in a previous step. For example, the system can be programmed to make only the computations necessary to provide enough data for the parameters (such as the last-measured angle) used in processing the point subsequent to the next point. Other alternatives can also be used.

The aforementioned conditions and parameters for retaining a point according to the preferred embodiment of the present invention are based on a reference resolution of 288 dpi. One skilled in the art would appreciate that if the reference resolution is changed, then the conditions and parameters should e correspondingly changed. Moreover, the above conditions and parameters are based on analyses of different speeds and curvatures of typical human handwriting using the Roman alphabet. One skilled in the art would also appreciate that the conditions and parameters can be adjusted to accommodate the attributes of handwriting in various languages that use other characters and alphabets such as Arabic, Greek, Hebrew, Kanji, Cyrillic, and Sanskrit.

After the system filters the sampled points down to a selected group of retained points, it stores the retained points in memory to represent the graphic data. The scaled, retained points are saved with other data (such as the kind of pen-tip style used for a stroke, and the ink thickness and color of the stroke) for the page.

Although there is a reduction in the number of points from the total number of sampled points to the resulting number of retained points, the retained points cannot amount to so few that an approximate rendition of the graphic data based on those retained points fails to present an image that is recognizable to the user. In the preferred embodiment of the present invention, the data compression scheme described above yields an average point-reduction ratio ranging between about 5:1 and about 10:1.

In the preferred embodiment of the present invention, when the user wants to view the data, an approximate rendition of the graphic data, in the form of a rough drawing based on the compressed data—for example, an image with straight-line connections between the retained points—is presented. The approximate rendition is a "partial" or "reduced" bitmap image of the graphic data. The invention can also process the compressed data to create a "full" or "complete" rendition of the graphic data by applying techniques including "smoothing" and "anti-aliasing" to the retained points so that the segments between the retained points more closely track the original curvature of the handwritten graphic data.

"Smoothing" describes any technique that reduces the effect of unwanted signal disturbances, or "noise," in the original image. Many different smoothing algorithms are well known in the field of computer graphics. In the preferred embodiment, the present system uses a smoothing algorithm that builds a set of smoothed points from an array of points (in this case the set of retained points) having a predetermined minimum distance between the points.

"Anti-aliasing" describes any technique used to curb the effects of aliasing. "Aliasing" is the visual misrepresentation that can occur when an image contains more detail than the resolution of the display device can present. One result of aliasing is the often jagged, "stair-stepping" appearance of slanted lines on a computer display or printout.

In addition, the present system preferably adds other information describing the original graphic data to the full bitmap image to make the full bitmap image more closely resemble the original graphic data. Such information describing the graphic data includes ink color, ink thickness, and pen-tip style (for example, calligraphy style and round-tip style).

The above smoothing, anti-aliasing, and other techniques provide a "full" bitmap image that more closely follows the original form and curvature of the graphic data than the partial bitmap image, even though both full and partial bitmaps are based on only the retained points.

Approximate renditions, or partial bitmap images, of the graphic data can be displayed at a much faster rate than corresponding complete renditions or full bitmap images of the same data. Moreover, partial bitmaps of graphic data take up roughly one-eighth of the memory storage taken up by full bitmaps of the same graphic data. In the preferred embodiment, the present system can display graphic data at the rate of five pages per second by using approximate renditions (using an 80486 processor running at 25 MHz). Yet, even at this rate, the graphic data remains as recognizable to the user as information on pages in a paper notebook being flipped quickly. For purposes of this application, a "page" will refer to the area displayed on the computer screen. Each "page" can be considered the functional equivalent of a page in a paper notebook.

The present invention achieves its speed when "flipping pages" of graphic data by initially rendering the partial bitmap image of a selected page of graphic data. The system then takes any existing machine idle time to perform additional rendering.

Depending on the availability of machine idle time, the system prepares renditions of both the next and the prior pages of graphic data off-screen, so that they are ready to be displayed as well. The system also renders a full bitmap image of the graphic data one polyline at a time to prepare a full bitmap image of the current page of graphic data for displaying.

Given sufficient idle time, the system renders bitmaps in the following order of decreasing priority: (1) a reduced bitmap of the current page; (2) a reduced bitmap of the next page; (3) a reduced bitmap of the prior page; (4) a full bitmap of the current page; (5) a full bitmap of the next page; and (6) a full bitmap of the prior page.

The rendering process is interruptable. If the user holds down a "NEXT PAGE" button for rapid display of successive pages, then only the partial bitmap images of the successive pages of graphic data are displayed. If the user stays on one page long enough so that there is sufficient idle time for the system to render full bitmaps of the current, next, and prior pages, then the system will display the full rendition of the current page, and will display the full rendition of the next or prior page if and when the user flips to one of those pages. If the user flips to either the next page or the prior page before the full bitmap of either is rendered, or to a more remote page, then the flipped-to page becomes the current page; and, given idle time, the system resumes rendering from the top of the priority chain.

For example, if the user flips to the next page after the reduced bitmap of the next page is rendered but the full bitmap of the next page is not completed (assume that the system has completed rendering for priority levels 1 through 4), then:

(a) the former next page becomes the new current page and the former current page becomes the new prior page;

(b) the reduced bitmap of the new current page (former next page) is displayed (if the full bitmap were already rendered, then the full bitmap would be displayed); and (c) the system resumes rendering from the top of the priority chain—here, the system saves processing time at new priority levels 1, 3, and 6 because it has already rendered a reduced bitmap for the new current page (former next page), a reduced bitmap for the new prior page (former current page), and a full bitmap for the new prior page (former current page).

As another example, if the user flips to the next page after the full bitmap of the next page is rendered (assume that the system has completed rendering for priority levels 1 through 5), then:

(a) the former next page becomes the new current page and the former current page becomes the new prior page;

(b) the full bitmap of the new current page (former next page) is displayed (having already been rendered for the former next page); and (c) the system resumes rendering from the top of the priority chain—here, the systems saves processing time at new priority levels 1, 3, 4, and 6 because it has already rendered a reduced bitmap for the new current page (former next page), a reduced bitmap for the new prior page (former current page), a full bitmap for the new current page (former next page), and a full bitmap for the new prior page (former current page).

Thus, given sufficient idle time in the example immediately above, the system need only render a reduced bitmap and a full bitmap for the new prior page to have full bitmaps of the new current, next, and prior pages ready for display.

As indicated above, the present system preferably manages at least three pages of graphic data at any given time: (1) the CURRENT page being displayed, (2) the NEXT page in numeric order, and (3) the PRIOR page in numeric order. Each of these areas (CURRENT, NEXT, PRIOR) contain the reduced points for the page, which in turn provide a series of polylines. Each area also holds information describing the status of rendering (for example, an indication of whether the full bitmap is completed) and other information describing the strokes of the graphic data, such as ink color, ink thickness, and pen-tip style. In addition, depending on the availability of machine idle time, the area holds a reduced bitmap and a full bitmap (or any available portions thereof) as well.

The present invention is preferably used with pen-based computer operating systems such as PenPoint™ from GO Corporation, of Foster City, Calif., and Microsoft Windows for Pen™ from Microsoft Corporation, of Redmond, Wash. The invention can also be used with other operating systems, both pen-based and non-pen-based, as well.

Pen-based operating systems such as Microsoft Windows for Pen™ provide input and output information to applications running under the operating system and provide certain functions and utilities that can be used by those applications. For example, Microsoft Windows for Pen™ provides certain data about stylus position and movement, such as "pen down," "pen up," "pen into proximity," "pen out of proximity," pen position, and a record of pen movement. Microsoft Windows for Pen™ also provides certain handwriting recognition algorithms, and provides access to a number of standard commands.

FIG. 1A illustrates a preferred embodiment of a handwriting-entry computer 10 of a type with which the present invention may be used. Computer 10 has a thin, flat housing 100. The front of the housing 105 features a position-sensing display panel 110 and a power switch 120. A power supply socket, a contrast control (not visible), and input/output (I/O) ports for communications, disk drive, and printer are preferably located along the back side 115 of housing 105.

The position-sensing display panel 110 referably has an electrostatic position-sensing surface preferably combined with a monochrome, liquid crystal display. The display preferably has a position-sensing resolution that is at least as high as the screen resolution (for example, 96 "pixels" per inch). The position-sensing surface preferably senses the position of a special stylus 125 when the tip of the stylus contacts, or is brought into close proximity with, the surface.

The stylus may be used to write characters, words, or illustrations on the display, as well as to select and manipulate displayed items. The handling of handwritten input generally depends on the specific software application being used.

Figure 1B:
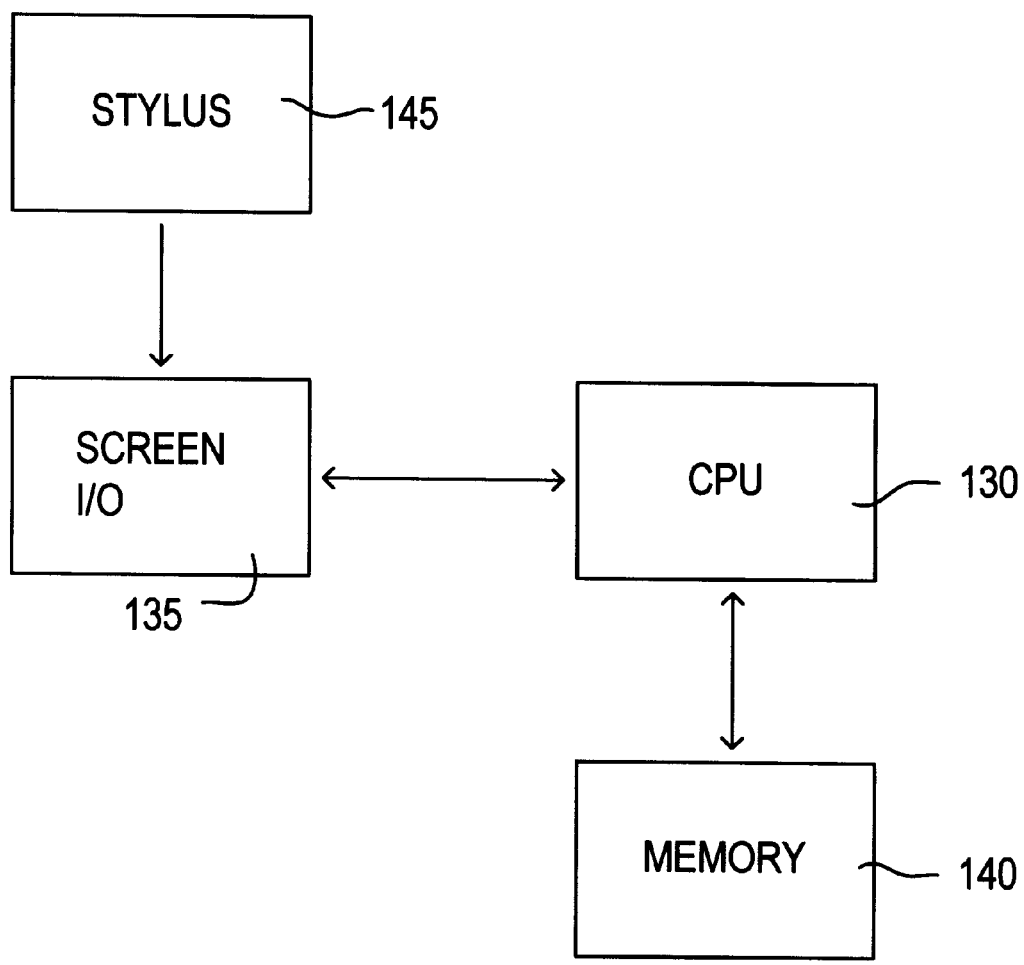
FIG. 1B is a block diagram of a handwriting-entry computer.

FIG. 1B is a block diagram representing a preferred embodiment of the handwriting computer of FIG. 1A. It includes a central processing unit (CPU) 130 that receives input from screen I/O 135. This input has been entered onto screen I/O 135 using stylus 145. CPU 130 sends processed output to screen I/O 135. CPU 130 also sends and receives data from memory 140. In the presently preferred embodiment of this invention, CPU 130 is a 80486 or 80586 processor—preferably an i486® or PENTIUM® processor made by Intel Corporation of Santa Clara, Calif., although any other suitable processing unit may be used.

With respect to the present invention, handwritten input is preferably recorded as a series of strokes or polylines. Each stroke or polyline preferably is determined by the movement of the stylus from a "pen down" event (when the tip of the stylus makes contact with the display) to an immediately following "pen up" event (when the tip of the stylus terminates contact with the display).

Figures 2A, 2B:
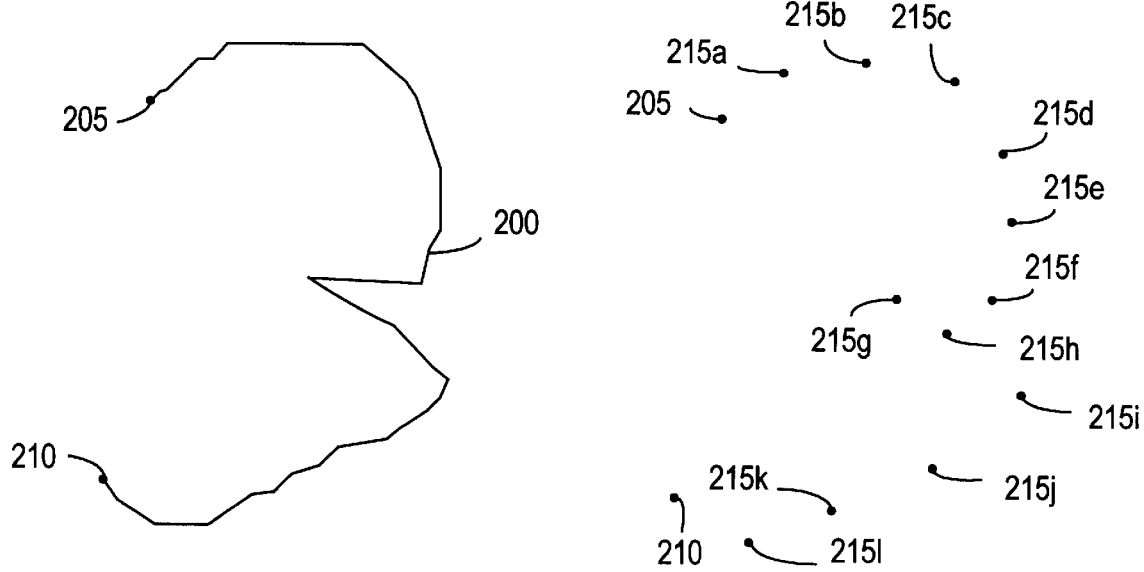
FIG. 2A illustrates a handwritten stroke representing the numeral "3"
FIG. 2B is a plot of the sampled data points for the handwritten "3" as recorded by the preferred embodiment of the invention.

FIGS. 2A and 2B illustrate how data points for a stroke are recorded for one preferred embodiment of the invention.

FIG. 2A provides an enlarged view of a handwritten stroke 200 that represents the numeral "3." The beginning point of stroke 200, that is, the point where the stylus first makes contact with the display, is point 205. The end point of stroke 200, that is, the point where the stylus is lifted from the display, is point 210.

The display is continually sampled at a rapid rate (in one preferred embodiment, approximately 200 times per second) to determine whether the stylus is contacting the display, and, if so, the coordinates of the point of contact. In this context, "contact" may include the situation where the tip of the stylus remains within a given small distance of the display.

The stroke-recording process begins when the tip of the stylus makes contact with the display. A "pen down" event is recorded, and the coordinates of the contact point are stored. At each succeeding sampling interval, the new position of the stylus is determined.

FIG. 2B illustrates the positions 215a to 215l of the stylus for each sampling interval between the "pen down" event at point 205 and the "pen up" event at point 210. In practice, there would probably be many more points sampled.

Stroke 200 can thus be described in terms of the coordinates of "pen down" point 205, intermediate positions 215a to 215l, and "pen up" point 210. The line segments between each pair of successive 35 intermediate positions can be described as "segments."

Handwritten input to the computer usually does not consist of a single stroke. Instead, handwriting generally includes letters, numbers, or words made up of groups of separate strokes. Strokes that are part of the same handwritten entry typically are closely spaced both in time and in position. In a preferred embodiment of the present invention, if the "pen down" event of a subsequent stroke occurs within approximately 500 milliseconds (the actual duration of the interval can be user-selectable) of the "pen up" event of the preceding stroke, then the subsequent stroke is considered to be part of the same handwritten entry as the preceding stroke. The same is preferably true if the second stroke is made without the stylus being brought out of proximity with, or raised more than approximately one-half inch above, the display screen between the "pen up" event of the first stroke and the "pen down" event of the second stroke.

In addition to or instead of the stroke description scheme described above, other forms of handwritten stroke descriptions may be used. Furthermore, depending on the specific embodiment of the invention, input means other than a hand-held stylus may be used to provide input to the invention. For example, input produced by a keyboard, a mouse, a mouse pen, a light pen, a finger (in conjunction with a touch-sensitive panel), a scanner, a video digitizer, or a digitizing pad may be used.

Figure 3:
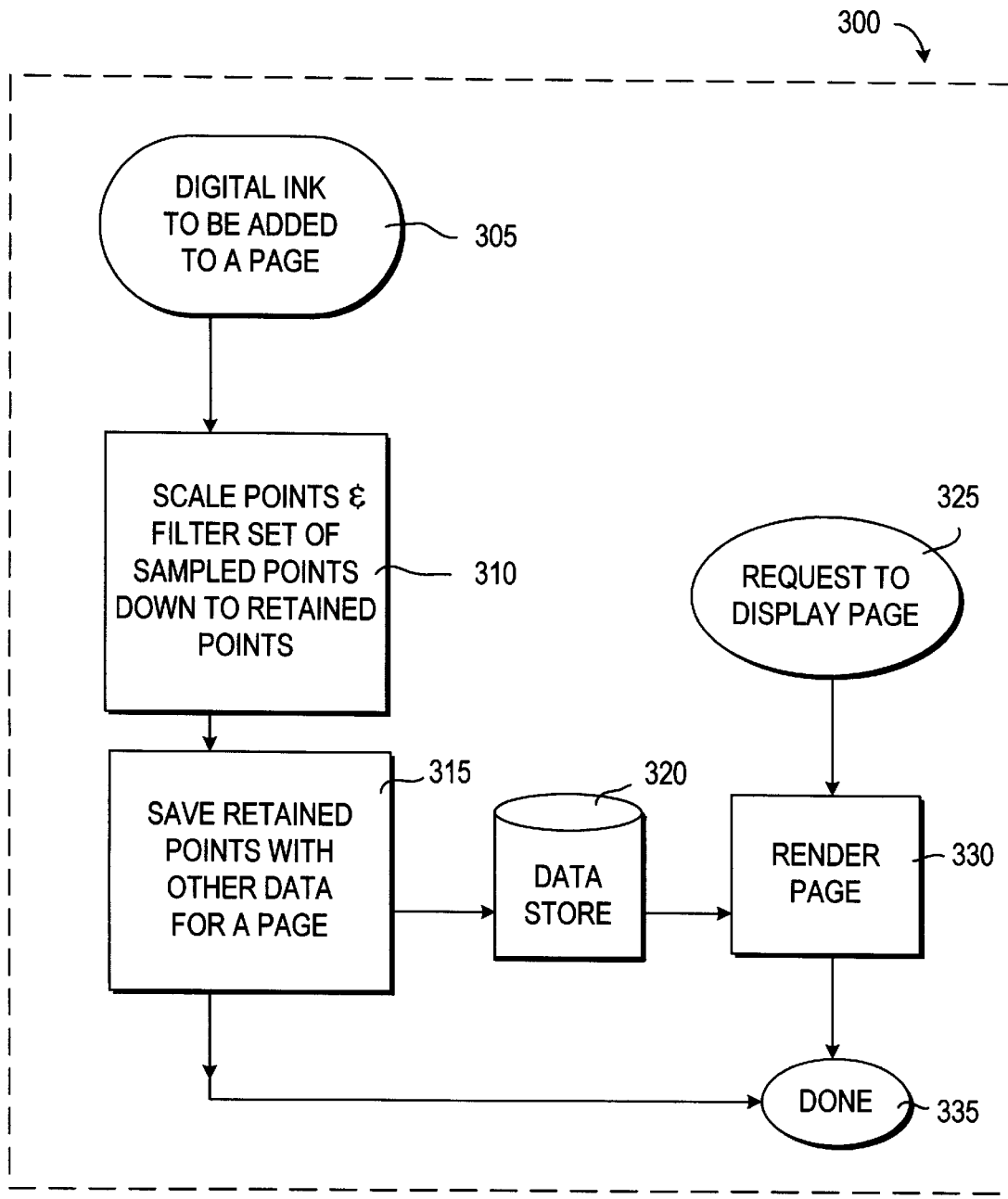
FIG. 3 is an overall flow chart of the preferred embodiment of the method of the present invention for storing and rapidly displaying graphic data.

FIG. 3 is an overall flow chart of the method 300 of the present invention for storing and rapidly displaying graphic data.

The method starts at state 305 where graphic data in the form of digital ink is added to a page by a user. Each time the user writes on the page, more strokes or polylines are generated, and more points are sampled by the system. Thus, prior to routine 310, the system has already accumulated a set of sampled points. With routine 310 (described in more detail below in connection with FIG. 4), the present system scales and filters the set of sampled points representing the graphic data down to a set of retained points. At step 315, the system saves the retained points as data for the page in data store 320. If at state 325 the user requests to display a page, then the system renders the page with routine 330 (described in more detail below in connection with FIG. 5).

Figure 4:
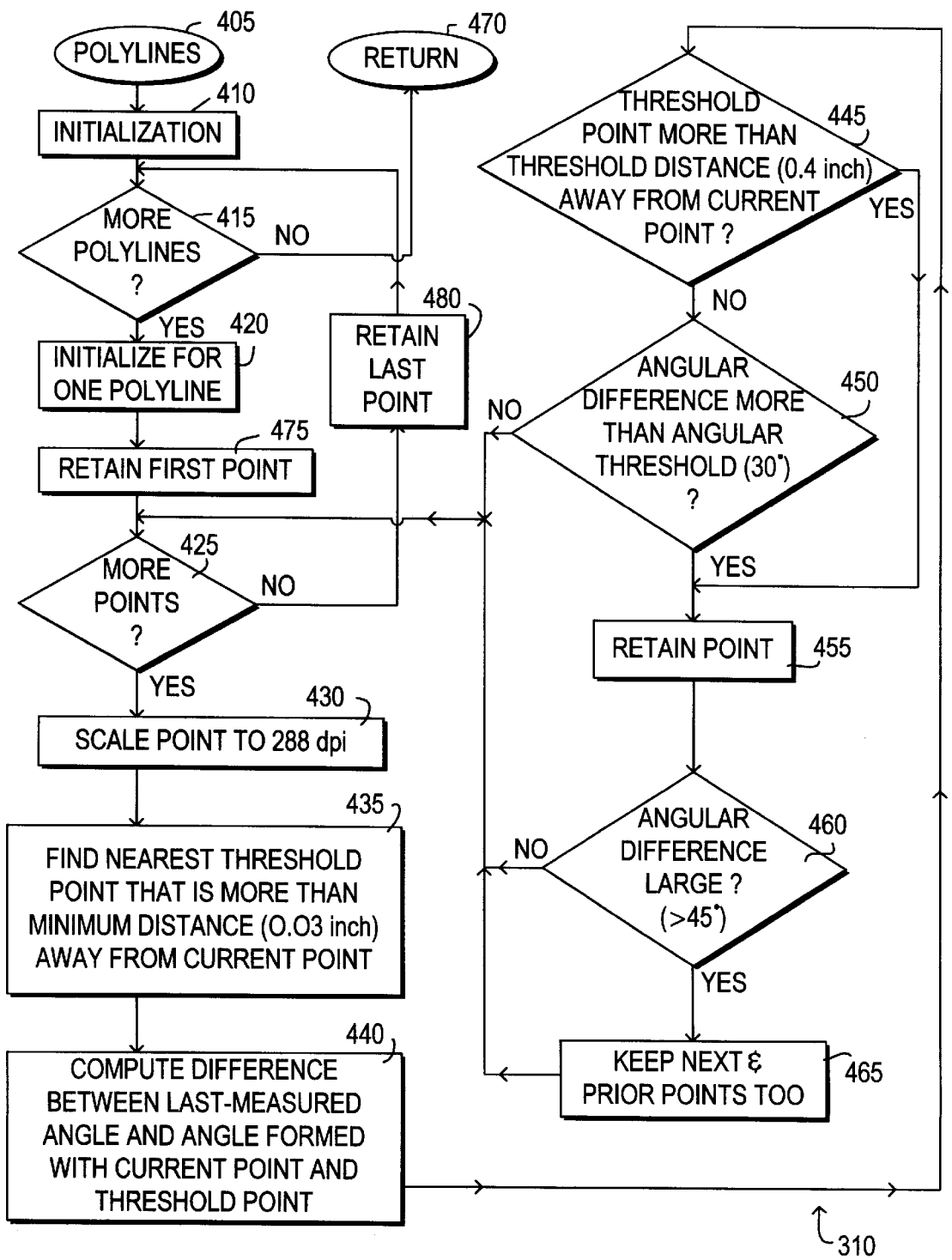
FIG. 4 is a flow chart of the preferred embodiment of the routine for scaling and filtering sampled points down to retained points.

FIG. 4 is a flow chart of the preferred embodiment of the routine 310 (see FIG. 3) for scaling and filtering the set of sampled points down to the set of retained points.

The processing of sampled points begins after the user enters graphic data as digital ink at state 305 (see FIG. 3). At state 405, the system samples the data captured in the form of polylines. The system performs general initialization, which is well known to persons skilled in the art of computer programming, at step 410 by setting parameters used in processing the sampled points to predefined values. For example, a number or counter designating the polyline to be processed is initialized to zero.

At test 415, the system determines whether it has finished handling all of the polylines representing the graphic data. If there are no polylines left, then the system returns at state 470 to method 300 (see FIG. 3). If there remains a polyline, then there necessarily remains at least one sampled point to be processed, and initialization step 420 is performed to predefine parameters for processing sampled points for one polyline. For example, a number or counter designating the point to be processed is initialized to zero. At step 475, the system retains the first sampled point on the polyline.

At test 425, the system determines whether it has finished processing the sampled points on a polyline. Test 425 can also determine whether the current point is the last point on the polyline. If it has finished processing the sampled points or if the current point is the last point, then the system retains the point as the last point at step 480. The system then returns to test 415 to see if it has finished with all the polylines.

If there remains an unprocessed point, then the system performs step 430, in which the current point is scaled to a reference resolution. In the preferred embodiment of this invention, the reference resolution is defined as 288 dpi. At step 435, the system finds a threshold point—the most recently retained point beyond a minimum distance away, which is preferably about 0.03 inch (about 0.0762 cm). Next, at step 440, the system computes the angular difference between (a) the angle formed by a horizontal or vertical reference line and a line segment connecting the current point to the threshold point obtained from previous step 435 and (b) the last computed angle from the last time the system executed this step.

At test 445, the system determines whether the threshold point is more than a threshold distance away from the current point. If it is, then the system moves on to step 455 where it keeps the current point as a retained point. In the preferred embodiment of the present invention, the threshold distance is about 0.40 inch (about 1.016 cm). If the linear distance between threshold point and the current point is less than or equal to the threshold distance, then the system performs test 450, where it determines whether the angular difference exceeds an angular threshold. If angular difference exceeds the angular threshold, which preferably is 30°, then the system retains the point in step 455. If the angular difference is at or below the threshold, then the system returns to test 425 to check for more unprocessed points.

When the system retains the current point, it also checks, in test 460, whether the angular difference is large enough that points immediately before and after the current point should be retained automatically. In the preferred embodiment, the difference requirement is 45°. If the angular difference exceeds this requirement, then both the next sampled point and the immediately prior sampled point are retained in step 465. Thus, a sampled point is not discarded until the following sampled point is processed, even if it does not meet the conditions in tests 445 and 450. If the angular difference does not exceed the requirement, then the system returns to test 425 to check for more unprocessed points.

When each sampled point and thus each polyline has been considered by the system so that no unprocessed points remain, the process of scaling and filtering all sampled points down to a set of retained points is completed. The system then moves to state 470, and returns to method 300 (see FIG. 3) having completed routine 310.

Figure 5:
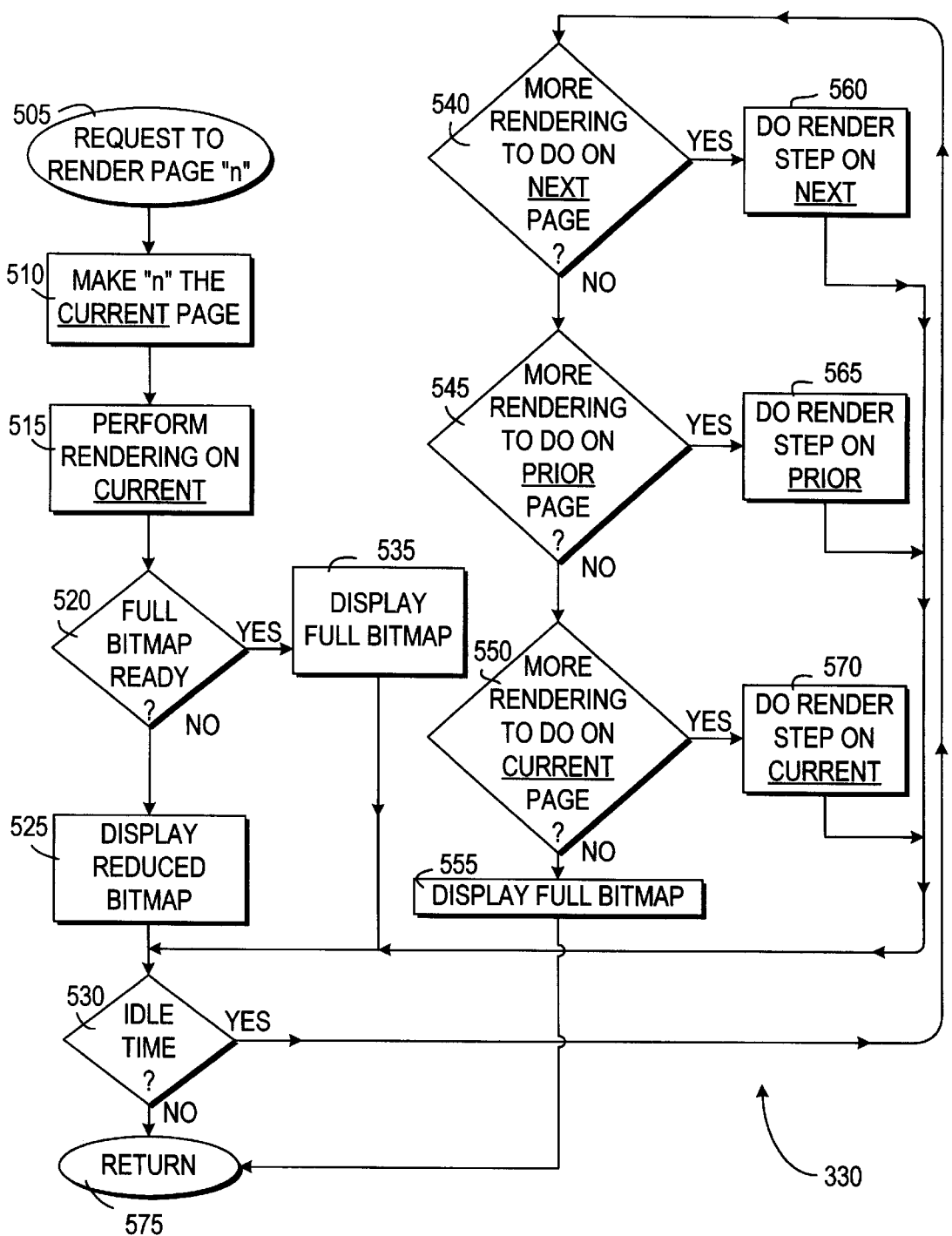
FIG. 5 is a flow chart of the preferred embodiment of the routine for rendering a page of graphic data.

FIG. 5 is a flow chart of the preferred embodiment of the routine 330 (see FIG. 3) for rendering a page, upon the user's request.

In response to a request to render page "n" at step 505, the system initializes CURRENT to "n" with routine 510 (described in more detail below in connection with FIG. 6). At step 515, the system performs rendering routine 700 (described in more detail below in connection with FIG. 7) on CURRENT. when, the system determines, preferably by looking to an indication of the rendering status, whether a full bitmap is ready at test 520 based on what was rendered in previous step 515. If a full bitmap is ready, then the system displays the full bitmap at step 535. If there is no full bitmap ready, then the reduced bitmap is displayed at step 525. After displaying either a full bitmap or a reduced bitmap, the system performs test 530 to determine whether there is any system idle time. If there is not, then the system returns at state 575 to method 300 (see FIG. 3) having completed routine 330, and awaits another request to render a page. Thus, even if there is no idle time, the system still ensures that at least a reduced bitmap of CURRENT is rendered and displayed.

If idle time exists, then the system moves on to test 540 to check whether there is rendering to be performed on NEXT. If so, then the system performs rendering routine 700 (described in more detail below in connection with FIG. 7) on NEXT in step 560. If there is no more rendering to perform on NEXT, then the system moves to test 545 to determine whether there is more rendering to be performed on PRIOR. If so, then the system performs rendering routine 700 (described in more detail below in connection with FIG. 7) on PRIOR in step 565. If there is no more rendering to be performed on PRIOR, then the system moves to test 550 to determine whether there is more rendering to be performed on CURRENT. If so, then the system performs rendering routine 700 (described in more detail below in connection with FIG. 7) on CURRENT in step 570. If not, then the system moves to step 555 and displays the full bitmap and then returns at state 575 to method 300 (see FIG. 3) having completed routine 330 for rendering a page. After rendering any of NEXT, PRIOR, or CURRENT in steps 560, 565, or 570 respectively, the system reverts to test 530 to check for more idle time to see if it has time to perform more rendering.

For tests 540 and 545, the resulting values are "NO" when NEXT or PRIOR has a reduced bitmap ready, and CURRENT does not have a full bitmap ready. In other words, when there is idle time: the system prioritizes the rendering of reduced bitmaps for NEXT and PRIOR before the rendering of a full bitmap for CURRENT; and after a full bitmap for CURRENT has been rendered, the system renders full bitmaps for NEXT and PRIOR. Thus:

(1) for test 540, the system takes the resulting "YES" path if (a) the reduced bitmap for NEXT is not ready or (b) the full bitmap for CURRENT is ready and the reduced bitmap for NEXT is ready, but the full bitmap for NEXT is not; and likewise (2) for test 545, the system takes the resulting "YES" path if (a) the reduced bitmap for PRIOR is not ready or (b) the full bitmap for CURRENT is ready and the reduced bitmap for PRIOR is ready but the full bitmap for PRIOR is not.

Routine 330 above implements the priority chain of rendering described earlier: (1) a reduced bitmap of CURRENT; (2) a reduced bitmap of NEXT; (3) a reduced bitmap of PRIOR; (4) a full bitmap of CURRENT; (5) a full bitmap of NEXT; and (6) a full bitmap of PRIOR.

Figure 6:
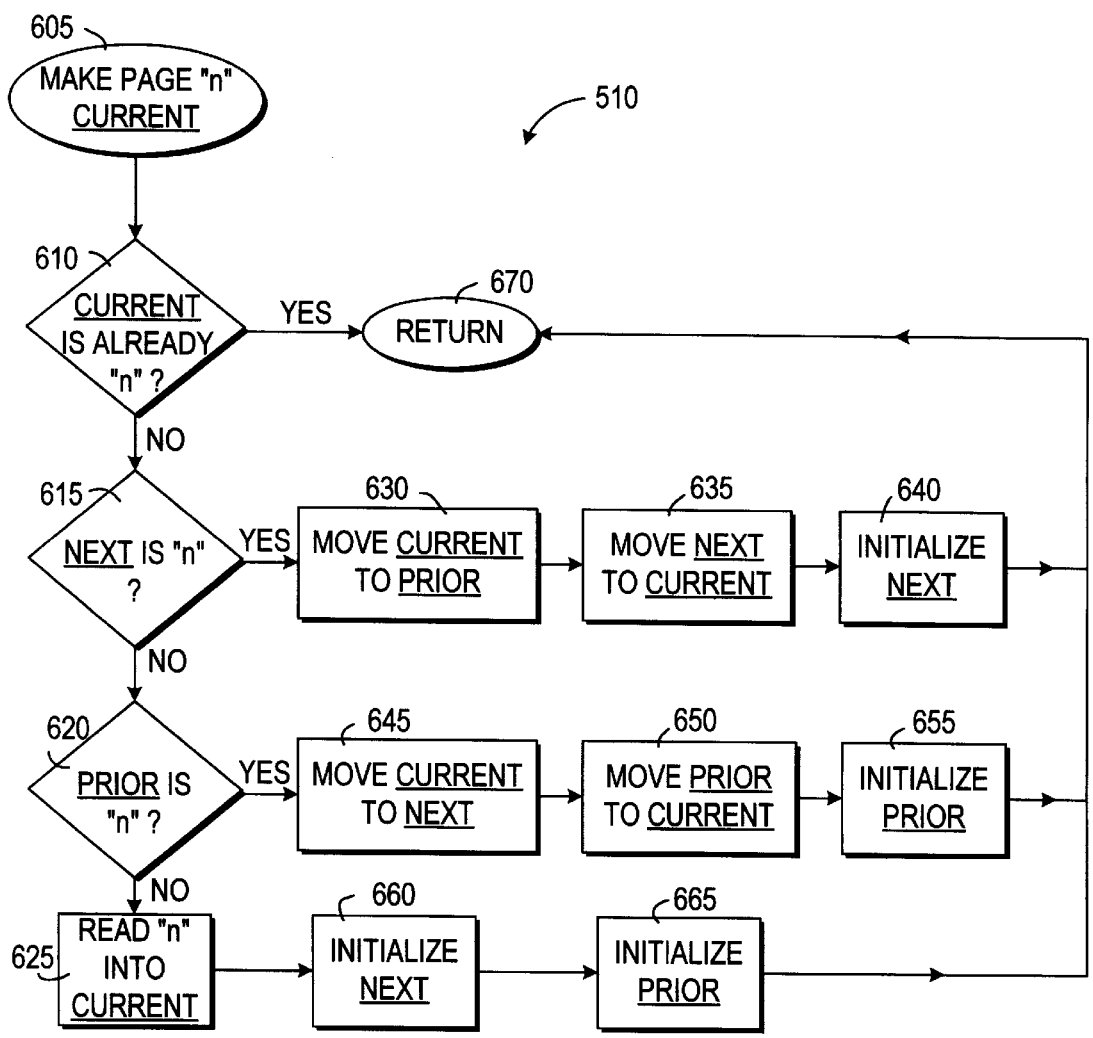
FIG. 6 is a flow chart of the preferred embodiment of the routine for initializing the current page.

FIG. 6 is a flow chart of the preferred embodiment of the routine 510 (see FIG. 5) for making a desired page the current page.

The algorithm responds to a request to make page "n" CURRENT at state 605. At test 610, the system determines whether "n" is already CURRENT. If it is, then no further steps are necessary—the system returns at state 670 to routine 330 (see FIG. 5) having completed routine 510 in response to a request to make "n" the current page.

If "n" is not CURRENT, then the system performs test 615 to determine whether "n" is NEXT. If it is, then the system performs steps 630, 635, and 640 to read the contents of CURRENT into PRIOR, read the contents of NEXT ("n") into CURRENT, and initialize NEXT respectively. Initializing an area (CURRENT, NEXT, or PRIOR) sets its page number to an impossible value or an empty set. Initialization also resets the rendering status to indicate that the two bitmaps in the area are "empty." The system then returns at state 670 to routine 330 (see FIG. 5).

If "n" is neither CURRENT nor NEXT, then the system performs test 620 to determine whether "n" is PRIOR. If it is, then the system performs steps 645, 650, and 655 to read the contents of CURRENT into NEXT, read the contents of PRIOR ("n") into CURRENT, and initialize PRIOR respectively. The system then returns at state 670 to routine 330 (see FIG. 5).

If "n" cannot be identified as any of the CURRENT, NEXT, or PRIOR areas, then the system performs step 625 to read the contents of "n" into CURRENT. The system also initializes NEXT and PRIOR at steps 660 and 665 respectively. The system then returns at state 670 to routine 330 (see FIG. 5).

Each of the CURRENT, NEXT, and PRIOR areas holds retained points in a series of polylines. Each area also holds status information for the drawing algorithm. In addition, each area holds a partial bitmap corresponding to an approximate rendition of the graphic data if available, and a full bitmap corresponding to a complete rendition of the graphic data if available.

Figure 7:
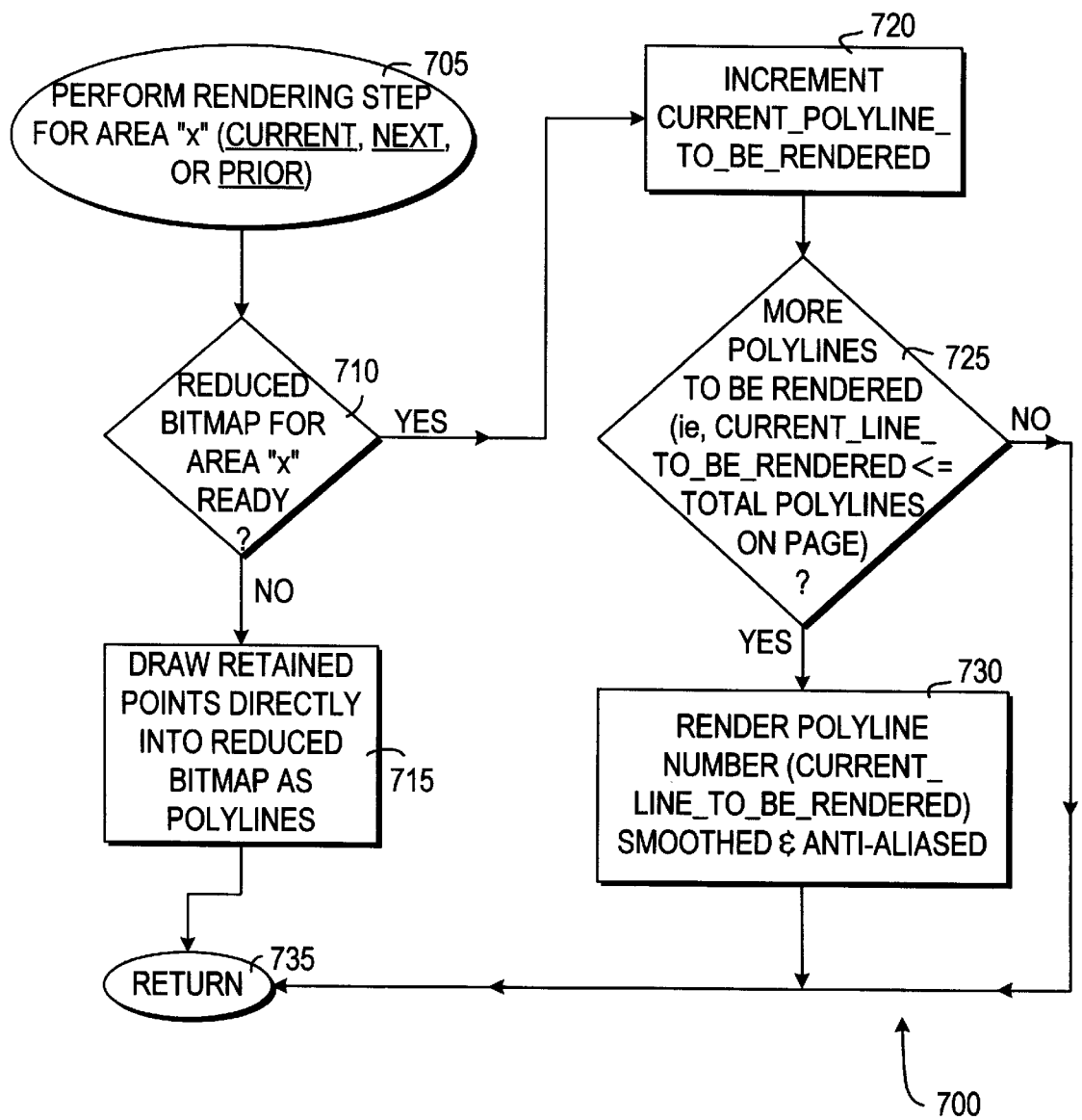
FIG. 7 is a flow chart of the preferred embodiment of the rendering routine for a given area.

FIG. 7 is a flow chart of the preferred embodiment of the rendering routine 700 invoked by steps 515, 560, 565, and 570 (see FIG. 5).

The rendering routine can be performed for any of the three areas managed by the system: CURRENT, NEXT, or PRIOR. At test 710, the system determines whether the reduced or partial bitmap for the given area is ready. If it is not, then the system performs step 715 of drawing the retained points for the given area directly into the reduced bitmap as multiple polylines. Thus, if the reduced bitmap is not ready to begin with, then the system renders only the reduced bitmap in rendering routine 700. The system then returns at state 735 to routine 330 (see FIG. 5) without a full bitmap ready.

If the reduced bitmap is ready, then the system adds one fully rendered polyline to the building of a full bitmap if the full bitmap has not already been rendered. This is accomplished by moving to step 720 and incrementing the value of CURRENT_LINE_TO_BE_RENDERED (CLTBR). Next, the system performs test 725 to determine whether the value of CLTBR is less than or equal to the total number of polylines on the page. Test 725 thus checks whether there are more polylines left to be rendered for a full bitmap. If there are none, then rendering of a full bitmap is completed. The system returns at state 735 to routine 330 (see FIG. 5), and the result of test 520 (see FIG. 5—whether the full bitmap is ready) is "YES" and the full bitmap is thus displayed at step 535 (see FIG. 5).

If, at test 725, the system determines that there are more polylines to be rendered in creating the full bitmap, then the system moves to step 730 to render the current polyline, applying smoothing and anti-aliasing algorithms. This single polyline is added as part of the full bitmap. Thus, if the full bitmap was one polyline short of being complete before the rendering step was invoked (for example, the system had enough idle time to render all but one polyline for the next page before the user flipped to the next page), then step 730 would complete the full bitmap. The system then returns at state 735 to routine 330 (see FIG. 5).

Figure 8A:
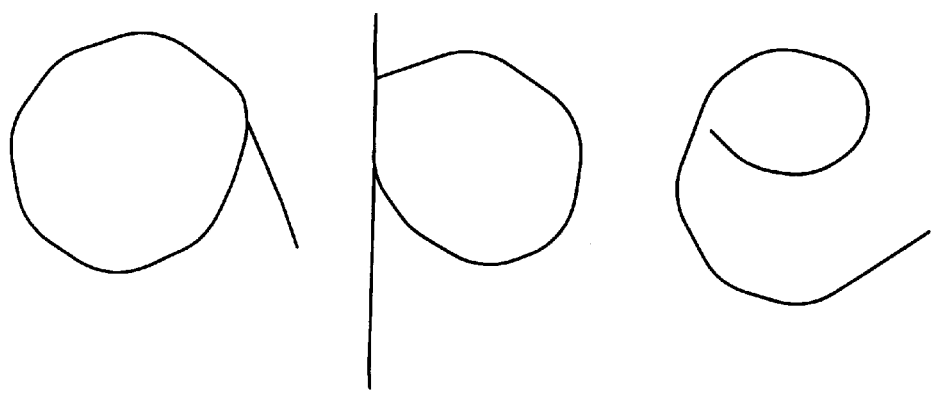
FIG. 8A is a coordinate diagram of the handwritten word "ape"

FIG. 8A is a coordinate diagram of the handwritten word "ape." Using the preferred embodiment of the invention, the set of sampled points is constructed by sampling each handwritten stroke at a preset frequency.

Figure 8B:
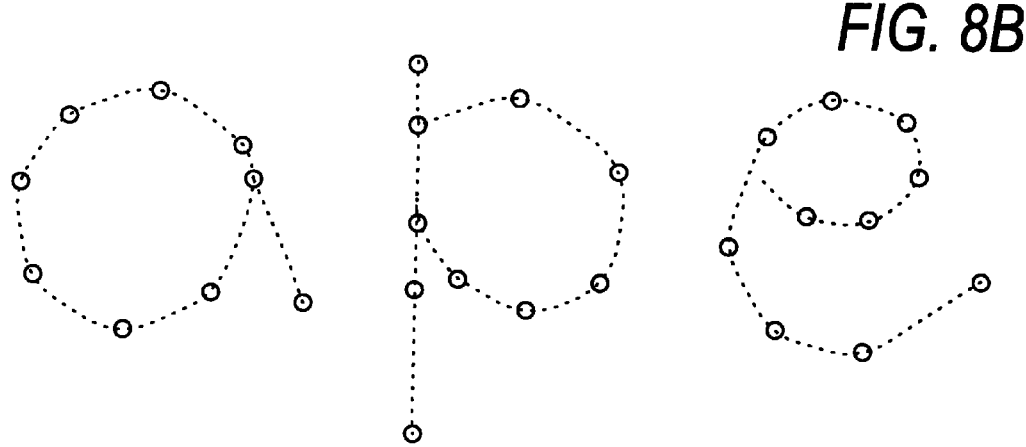
FIG. 8B is a plot of the retained data points and the discarded data points sampled by the preferred embodiment of the invention.

FIG. 8B is an exemplary plot of the points on the handwritten word "ape" sampled by the preferred embodiment of the invention, with the retained points highlighted. The present system derives the set of retained points by using the steps described above and iterating them for each polyline. The system stores the set of retained points as data for the page containing "ape" and discards the remaining sampled points.

Figure 8C:
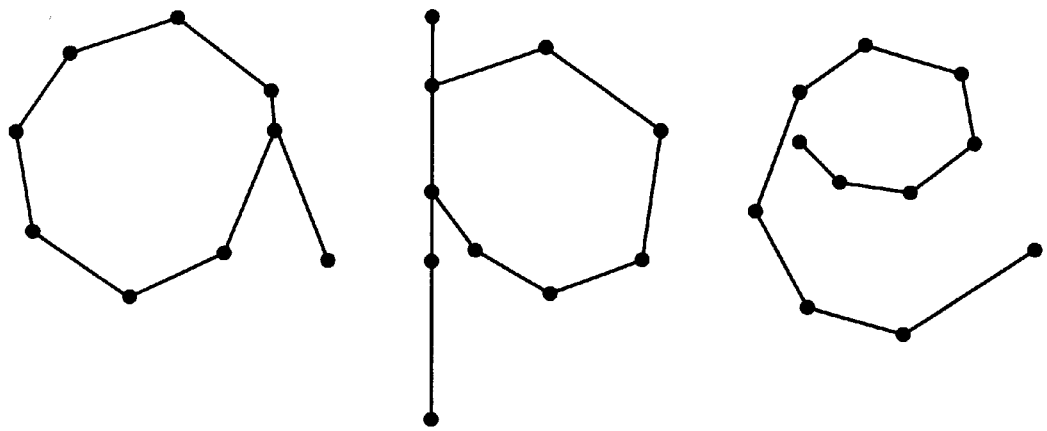
FIG. 8C illustrates the approximately rendered image representing the handwritten word "ape"

FIG. 8C illustrates the approximately rendered form of the handwritten word "ape." In this preferred embodiment, the approximate rendition being displayed is the result of simple straight-line connections between the retained points. The graphic data represented by the approximate rendition, however, is still easily recognizable as the handwritten word "ape." Other approximate renditions based on the retained points are also within the scope of this invention.

Figure 8D:
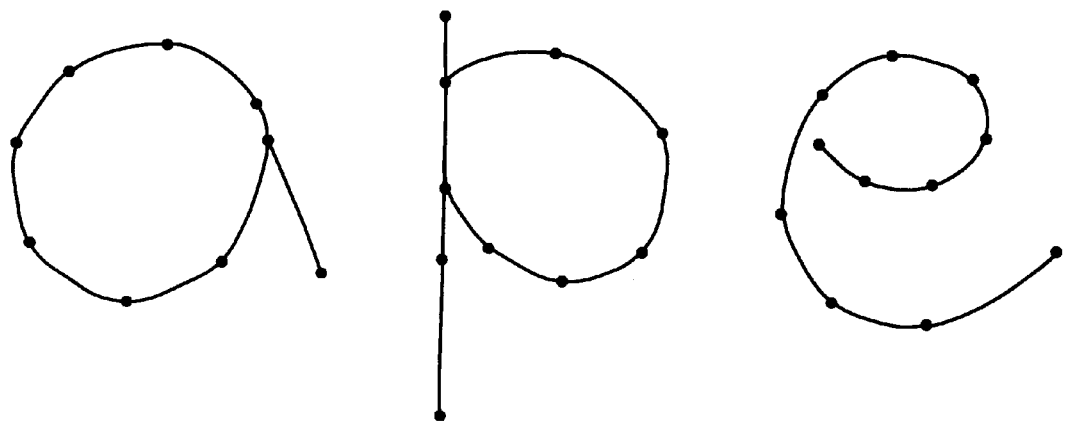
FIG. 8D illustrates the fully rendered image representing the handwritten word "ape."

FIG. 8D illustrates the fully rendered form of the handwritten word "ape." Application of smoothing techniques results in a fully rendered form that more closely matches the original curvature of the handwritten graphic data. The segments connecting the retained points no longer appear as simple straight lines. Furthermore, application of anti-aliasing techniques fills in areas where there would otherwise be jagged lines to give an overall impression of smoothness. Because jagged areas are filled in, the polylines in the resulting full rendition can often appear thicker than the polylines in the approximate rendition, and, in certain instances, even thicker than the polylines in the graphic data as originally inputted.

Thus it is seen that a system for storing and rapidly yet recognizably displaying handwritten graphic data is provided. One skilled in the art will appreciate that the present invention can be practiced by other than the described embodiments, which are presented for purposes of illustration and not of limitation, and the present invention is limited only by the claims that follow.

What is claimed is:

1. A method for rapid and recognizable display of graphic data, comprising the steps of:

receiving input of a block of data;

providing a field for receiving and being associated with the block of data;

entering the block of data into the field;

generating a set of approximate descriptors which defines a partially rendered form of the block of data;

determining whether there is an available period of idle time after generation of the set of approximate descriptors is completed;

generating from only the set of approximate descriptors that defines the partially rendered form of the block of data, during the available period of idle time after generation of the set of approximate descriptors is completed, a set of full descriptors which defines a fully rendered form of the block of data;

providing a status indicator for indicating whether generation of the set of full descriptors is completed; and displaying the block of data in (a) its fully rendered form when the status indicator indicates that generation of the set of full descriptors is completed, and (b) its partially rendered form when the status indicator indicates that generation of the set of full descriptors is not completed.

2. The method of claim 1, wherein the step of generating the set of approximate descriptors comprises the steps of:

sampling the block of data at a predetermined rate to derive a first point and at least one current point sampled subsequent to the first point; and scaling the first point and each current point to a reference resolution.

3. The method of claim 2, wherein the reference resolution is 288 dots per inch.

4. The method of claim 2, wherein:

each current point is characterized by a distance and a current angle with respect to a threshold point sampled prior to the current point; and each threshold point is characterized by a preceding angle with respect to a preceding point sampled prior to the threshold point.

5. The method of claim 4, further comprising the steps of:
retaining the first point as a datum for the field; and
for each current point, determining whether the current point should be retained as a datum for the field.

6. The method of claim 5, wherein the step of determining whether the current point should be retained as a datum for the field comprises the steps of:
determining whether the current point is a last point;
finding the threshold point nearest to the current point for which the distance between the current point and the threshold point exceeds a minimum distance;
measuring the distance between the current point and the threshold point;
computing the current angle formed by (a) a line segment connecting the current point and the threshold point and (b) one of a horizontal reference line and a vertical reference line;
deriving an angular difference between the current angle and the preceding angle formed by (a) a line segment connecting the threshold point and the preceding point and (b) one of a horizontal reference line and a vertical reference line; and
retaining the current point as a datum for the field if (a) the distance between the current point and the threshold point exceeds a threshold distance, (b) the angular difference exceeds a threshold angular difference, or (c) the current point is the last point.

7. The method of claim 6, wherein the minimum distance is about 0.03 inch (about 0.076 centimeters).

8. The method of claim 6, wherein the threshold distance is about 0.40 inch (about 1.016 centimeters).

9. The method of claim 6, wherein the threshold angular difference is about 30°.

10. The method of claim 6, further comprising the step of retaining as data for the field, if the angular difference exceeds a second threshold angular difference, both (a) a point sampled immediately before the current point and (b) a point sampled immediately after the current point.

11. The method of claim 10, wherein the second threshold angular difference is about 45°.

12. The method of claim 1, wherein the step of receiving input of the block of data is performed with a digitizer.

13. The method of claim 12, wherein the steps of receiving input of the block of data and displaying the block of data are performed with a digitizer integrated with a computer display.

14. The method of claim 1, wherein the step of entering the block of data into the field is performed with a hand-held stylus.

15. A method for rapid and recognizable display of graphic data, comprising the steps of:
receiving input of a plurality of blocks of data;
providing a plurality of fields for receiving and being associated with the plurality of blocks of data respectively;
entering the plurality of blocks of data into the plurality of fields respectively;
generating, for each of the plurality of blocks of data, a set of approximate descriptors which defines a partially rendered form of the block of data;
determining, for each of the plurality of blocks of data, whether there is an available period of idle time after generation of the set of approximate descriptors is completed;
for at least one of the plurality of blocks of data, generating from only the set of approximate descriptors that defines the partially rendered form of the block of data, during the available period of idle time after generation of the set of approximate descriptors is completed, a set of full descriptors which defines a fully rendered form of the block of data;
providing, for each of the plurality of blocks of data, a status indicator for indicating whether generation of the set of full descriptors is completed; and
successively displaying requested ones of the plurality of blocks of data, each respective block of data being displayed in (a) its fully rendered form when the respective status indicator indicates that generation of the respective set of full descriptors is completed, and (b) its partially rendered form when the respective status indicator indicates that generation of the respective set of full descriptors is not completed, at least one block of data being displayed in its partially rendered form.

16. The method of claim 15, further comprising the step of receiving input of a desired display mode, the desired display mode being one of (a) a normal mode and (b) a rapid mode, in which the plurality of blocks of data are displayed in succession more rapidly than in the normal mode.

17. The method of claim 16, wherein, when the desired display mode is the rapid mode, the plurality of blocks of data are displayed in succession, each of the plurality of blocks of data being displayed in its partially rendered form.

18. The method of claim 15, wherein the step of generating the plurality of sets of approximate descriptors comprises the steps of, for each of the plurality of blocks of data:
sampling the block of data at a predetermined rate to derive a first point and at least one current point; and
scaling the first point and each current point to a reference resolution.

19. The method of claim 18, wherein the reference resolution is 288 dots per inch.

20. The method of claim 18, wherein, for each of the plurality of blocks of data:
each current point is characterized by a distance and a current angle with respect to a threshold point sampled prior to the current point; and
each threshold point is characterized by a preceding angle with respect to a preceding point sampled prior to the threshold point.

21. The method of claim 20, further comprising the steps of, for each of the plurality of blocks of data and respective field:
retaining the first point as a datum for the field; and
for each current point, determining whether the current point should be retained as a datum for the field.

22. The method of claim 21, wherein the step of determining whether the current point should be retained as a datum for the field comprises the steps of:
determining whether the current point is a last point;
finding the threshold point nearest to the current point wherein the distance between the current point and the threshold point exceeds a minimum distance;
measuring the distance between the current point and the threshold point;
deriving an angular difference between the current angle and the preceding angle formed by (a) a line segment connecting the threshold point and the preceding point and (b) a horizontal reference or a vertical reference; and
retaining the current point as a datum for the field if (a) the distance between the current point and the threshold point exceeds a threshold distance, (b) the angular difference exceeds a threshold angular difference, or (c) the current point is the last point.

23. The method of claim 22, wherein the predetermined minimum distance is about 0.03 inch (about 0.076 centimeters).

24. The method of claim 22, wherein the threshold distance is about 0.40 inch (about 1.016 centimeters).

25. The method of claim 22, wherein the threshold angular difference is about 30°.

26. The method of claim 22, further comprising the step of retaining as data for the field, if the angular difference exceeds a second threshold angular difference, both: (a) a point sampled immediately before the current point, and (b) a point sampled immediately after the current point.

27. The method of claim 26, wherein the second threshold angular difference is about 45°.

28. The method of claim 15, wherein the step of receiving input of the plurality of blocks of data is performed with a digitizer.

29. The method of claim 28, wherein the steps of receiving input of the plurality of blocks of data and displaying the plurality of blocks of data are performed with a digitizer integrated with a computer display.

30. The method of claim 15, wherein the step of entering the plurality of blocks of data into the plurality of fields respectively is performed with a hand-held stylus.

31. An apparatus for rapid and recognizable display of graphic data, comprising:
    a receiver for receiving input of a block of data;
    a field for being associated with the block of data;
    a data-entry device for entering the block of data into the field;
    a partial-form generator for generating a set of approximate descriptors defining a partially rendered form of the block of data;
    a clock for determining whether there is an available period of idle time after generation of the set of approximate descriptors is completed;
    a full-form generator for generating from only the set of approximate descriptors that defines the partially rendered form of the block of data, during the available period of idle time after generation of the set of approximate descriptors is completed, a set of full descriptors defining a fully rendered form of the block of data;
    a status indicator for indicating whether generation of the set of full descriptors is completed; and
    a display for displaying the block of data in (a) its fully rendered form when the status indicator indicates that generation of the set of full descriptors is completed, and (b) its partially rendered form when the status indicator indicates that generation of the set of full descriptors is not completed.

32. The apparatus of claim 31, wherein the partial-form generator comprises:
    a data sampler for sampling the block of data at a predetermined rate to derive a first point and at least one current point; and
    a data scaler for scaling the first point and each current point to a reference resolution.

33. The apparatus of claim 32, wherein the reference resolution applied by the data scaler is 288 dots per inch.

34. The apparatus of claim 32, wherein:
    the partial-form generator relates each current point to a threshold point, sampled prior to the current point, in terms of a distance and a current angle; and
    the partial-form generator relates each threshold point to a preceding point, sampled prior to the threshold point, in terms of a preceding angle.

35. The apparatus of claim 34, further comprising:
    memory for storing the first point as a datum for the field; and
    a data processor for determining which of the current points should be retained as data for the field.

36. The apparatus of claim 35, wherein the data processor comprises:
    a last-point detector for determining whether the current point is a last point;
    a threshold-point detector for finding the threshold point nearest to the current point for which the distance between the current point and the threshold point exceeds a minimum distance;
    a distance detector for measuring the distance between the current point and the threshold point;
    an angle detector for computing the current angle formed by (a) a line segment connecting the current point and the threshold point and (b) one of a horizontal reference line and a vertical reference line;
    a comparator for deriving an angular difference between the current angle and the preceding angle formed by (a) a line segment connecting the threshold point and the preceding point and (b) one of a horizontal reference line and a vertical reference line; and
    a point filter for retaining the current point in memory as a datum for the field if (a) the distance between the current point and the threshold point exceeds a threshold distance, (b) the angular difference exceeds a threshold angular difference, or (c) the current point is the last point.

37. The apparatus of claim 36, wherein the minimum distance applied by the threshold-point detector is about 0.03 inch (about 0.076 centimeters).

38. The apparatus of claim 36, wherein the threshold distance applied by the point filter is about 0.40 inch (about 1.016 centimeters).

39. The apparatus of claim 36, wherein the threshold angular difference applied by the point filter is about 30°.

40. The apparatus of claim 36, wherein the point filter also retains as data for the field, if the angular difference exceeds a second threshold angular difference, both (a) a point sampled immediately before the current point and (b) a point sampled immediately after the current point.

41. The apparatus of claim 40, wherein the second threshold angular difference applied by the point filter is about 45°.

42. The apparatus of claim 31, wherein the receiver is a digitizer.

43. The apparatus of claim 42, wherein the digitizer is integrated with the display.

44. The apparatus of claim 31, wherein the data-entry device is a hand-held stylus.

45. An apparatus for rapid and recognizable display of graphic data, comprising:
    a receiver for receiving input of a plurality of blocks of data;
    a plurality of fields for being associated with the plurality of blocks of data respectively;
    a data-entry device for entering the plurality of blocks of data into the plurality of fields respectively;
    a partial-form generator for generating, for each of the plurality of blocks of data, a set of approximate descriptors which defines a partially rendered form of the block of data;

a clock for determining, for each of the plurality of blocks of data, whether there is an available period of idle time after generation of the set of approximate descriptors is completed;

a full-form generator for generating from only the set of approximate descriptors that defines the partially rendered form of the block of data, for at least one of the plurality of blocks of data, during the available period of idle time after generation of the set of approximate descriptors is completed, a set of full descriptors defining a fully rendered form of the block of data;

a status indicator for indicating, for each of the plurality of blocks of data, whether generation of the set of full descriptors is completed; and a display for successively displaying requested ones of the plurality of blocks of data, each respective block of data being displayed in (a) its fully rendered form when the status indicator indicates that generation of the set of full descriptors is completed, and (b) its partially rendered form when the status indicator indicates that generation of the set of full descriptors is not completed, at least one block of data being displayed in its partially rendered form.

46. The apparatus of claim 45, further comprising a display-mode receiver for receiving input of a desired display mode, the desired display mode being one of (a) a normal mode and (b) a rapid mode, in which the plurality of blocks of data are displayed in succession more rapidly than in the normal mode.

47. The apparatus of claim 46, wherein, when the desired display mode is the rapid mode, the display displays each of the plurality of blocks of data in succession and in its partially rendered form.

48. The apparatus of claim 45, wherein the partial-form generator comprises:

a data sampler which, for each of the plurality of blocks of data, samples the block of data at a predetermined rate to derive a first point and at least one current point; and a data scaler which, for each of the plurality of blocks of data, scales the first point and each current point to a reference resolution.

49. The apparatus of claim 48, wherein the reference resolution applied by the data scaler is 288 dots per inch.

50. The apparatus of claim 48, wherein, for each of the plurality of blocks of data:

the partial-form generator relates each current point to a threshold point, sampled prior to the current point, in terms of a distance and a current angle; and the partial-form generator relates each threshold point to a preceding point, sampled prior to the threshold point, in terms of a preceding angle.

51. The apparatus of claim 50, further comprising:

memory which, for each of the plurality of blocks of data and respective field, stores the first point as a datum for the field; and a data processor which, for each of the plurality of blocks of data and respective field, determines which of the current points should be retained as data for the field.

52. The apparatus of claim 51, wherein the data processor comprises:

a last-point detector for determining whether the current point is a last point;

a threshold-point detector for finding the threshold point nearest to the current point wherein the distance between the current point and the threshold point exceeds a minimum distance;

a distance detector for measuring the distance between the current point and the threshold point;

an angle detector for computing the current angle formed by (a) a line segment connecting the current point and the threshold point and (b) one of a horizontal reference line and a vertical reference line;

a comparator for deriving an angular difference between the current angle and the preceding angle formed by (a) a line segment connecting the threshold point and the preceding point and (b) one of a horizontal reference line and a vertical reference line; and a point filter for retaining the current point in memory as a datum for the field if (a) the distance between the current point and the threshold point exceeds a threshold distance, (b) the angular difference exceeds a threshold angular difference, or (c) the current point is the last point.

53. The apparatus of claim 52, wherein the minimum distance applied by the threshold-point detector is about 0.03 inch (about 0.076 centimeters).

54. The apparatus of claim 52, wherein the threshold distance applied by the point filter is about 0.40 inch (about 1.016 centimeters).

55. The apparatus of claim 52, wherein the threshold angular difference applied by the point filter is about 30°.

56. The apparatus of claim 52, wherein the point filter also retains as data for the field, if the angular difference exceeds a second threshold angular difference, both: (a) a point sampled immediately before the current point, and (b), a point sampled immediately after the current point.

57. The apparatus of claim 56, wherein the second threshold angular difference applied by the point filter is about 45°.

58. The apparatus of claim 45, wherein the receiver is a digitizer.

59. The apparatus of claim 45, wherein the digitizer is integrated with the display.

60. The apparatus of claim 45, wherein the data-entry device is a hand-held stylus.

61. A system comprising:

a central processing unit;

a display connected to the central processing unit;

a user input device connected to the central processing unit; and an apparatus operatively associated with the central processing unit for rapid and recognizable display of graphic data;

wherein:

the user input device comprises:

a receiver for receiving input of a block of data, a field for being associated with the block of data, and a data-entry device for entering the block of data into the field;

the apparatus comprises:

a partial-form generator for generating a set of approximate descriptors defining a partially rendered form of the block of data, a clock for determining whether there is an available period of idle time after generation of the set of approximate descriptors is completed, a full-form generator for generating from only the set of approximate descriptors that defines the partially rendered form of the block of data, during the available period of idle time after generation of the set; of approximate descriptors is completed, a set of full descriptors defining a filly rendered form of the block of data, and a status indicator for indicating whether generation of the set of full descriptors is completed; and the display displays the block of data in (a) its fully rendered form when the status indicator indicates that generation of the set of full descriptors is completed, and (b) its partially rendered form when the status indicator indicates that generation of the set of full descriptors is not completed.

62. The system of claim 61, wherein the partial-form generator comprises:

a data sampler for sampling the block of data at a predetermined rate to derive a first point and at least one current point; and a data scaler for scaling the first point and each current point to a reference resolution.

63. The system of claim 62, wherein the reference resolution applied by the data scaler is 288 dots per inch.

64. The system of claim 62, wherein:

the partial-form generator relates each current point to a threshold point, sampled prior to the current point, in terms of a distance and a current angle; and the partial-form generator relates each threshold point to a preceding point, sampled prior to the threshold point, in terms of a preceding angle.

65. The system of claim 64, further comprising:

memory for storing the first point as a datum for the field; and a data processor for determining which of the current points should be retained as data for the field.

66. The system of claim 65, wherein the data processor comprises:

a last-point detector for determining whether the current point is a last point;

a threshold-point detector for finding the threshold point nearest to the current point for which the distance between the current point and the threshold point exceeds a minimum distance;

a distance detector for measuring the distance between the current point and the threshold point;

an angle detector for computing the current angle formed by (a) a line segment connecting the current point and the threshold point and (b) one of a horizontal reference line and a vertical reference line;

a comparator for deriving an angular difference between the current angle and the preceding angle formed by (a) a line segment connecting the threshold point and the preceding point and (b) one of a horizontal reference line and a vertical reference line; and a point filter for retaining the current point in memory as a datum for the field if (a) the distance between the current point and the threshold point exceeds a threshold distance, (b) the angular difference exceeds a threshold angular difference, or (c) the current point is the last point.

67. The system of claim 66, wherein the minimum distance applied by the threshold-point detector is about: 0.03 inch (about 0.076 centimeters).

68. The system of claim 66, wherein the threshold distance applied by the point filter is about 0.40 inch (about 1.016 centimeters).

69. The system of claim 66, wherein the threshold angular difference applied by the point filter is about 30°.

70. The system of claim 66, wherein the point filter also retains as data for the field, if the angular difference exceeds.a second threshold angular difference, both (a) a point sampled immediately before the current point and (b) a point sampled immediately after the current point.

71. The system of claim 70, wherein the second threshold angular difference applied by the point filter is about 45°.

72. The system of claim 61, wherein the receiver is a digitizer.

73. The system of claim 72, wherein the digitizer is integrated with the display.

74. The system of claim 71, wherein the data-entry device is a hand-held stylus.

75. A system comprising:

a central processing unit;

a display connected to the central processing unit;

a user input device connected to the central processing unit; and an apparatus operatively associated with the central processing unit for rapid and recognizable display of graphic data;

wherein:

the user input device comprises:

a receiver for receiving input of a plurality of blocks of data, a plurality of fields for being associated with the plurality of blocks of data respectively, and a data-entry device for entering the plurality of blocks of data into the plurality of fields respectively;

the apparatus comprises:

a partial-form generator for generating, for each of the plurality of blocks of data, a set of approximate descriptors which defines a partially rendered form of the block of data, a clock for determining, for each of the plurality of blocks of data, whether there is an available period of idle time after generation of the set, of approximate descriptors is completed, a full-form generator for generating from only the set of approximate descriptors that defines the partially rendered form of the block of data, for at least one of the plurality of blocks of data, during the available period of idle time after generation of the set of approximate descriptors is completed, a set of full descriptors defining a fully rendered form of the block of data, and a status indicator for indicating, for each of the plurality of blocks of data, whether generation of the set of full descriptors is completed; and the display successively displays requested ones of the plurality of blocks of data, each respective block of data being displayed in (a) its fully rendered form when the status indicator indicates that generation of the set of full descriptors is completed, and (b) its partially rendered form when the status indicator indicates that generation of the set of full descriptors is not completed, at least one block of data being displayed in its partially rendered form.

76. The system of claim 75, wherein the apparatus further comprises a display-mode receiver for receiving input of a desired display mode, the desired display mode being one of (a) a normal mode and (b) a rapid mode, in which the plurality of blocks of data are displayed in succession more rapidly than in the normal mode.

77. The system of claim 76, wherein, when the desired display mode is the rapid mode, the display displays each of the plurality of blocks of data in succession and in its partially rendered form.

78. The system of claim 75, wherein the partial-form generator comprises:

a data sampler which, for each of the plurality of blocks of data, samples the block of data at a predetermined rate to derive a first point and at least one current point; and a data scaler which, for each of the plurality of blocks of data, scales the first point and each current point to a reference resolution.

79. The system of claim 78, wherein the reference resolution applied by the data scaler is 288 dots per inch.

80. The system of claim 78, wherein, for each of the plurality of blocks of data:

the partial-form generator relates each current point to a threshold point, sampled prior to the current point, in terms of a distance and a current angle; and the partial-form generator relates each threshold point to a preceding point, sampled prior to the threshold point, in terms of a preceding angle.

81. The system of claim 80, further comprising:

memory which, for each of the plurality of blocks of data and respective field, stores the first point as a datum for the field; and a data processor which, for each of the plurality of blocks of data and respective field, determines which of the current points should be retained as data for the field.

82. The system of claim 81, wherein the data processor comprises:

a last-point detector for determining whether the current point is a last point;

a threshold-point detector for finding the threshold point nearest to the current point wherein the distance between the current point and the threshold point exceeds a minimum distance;

a distance detector for measuring the distance between the current point and the threshold point;

an angle detector for computing the current angle formed by (a) a line segment connecting the current point and the threshold point and (b) one of a horizontal reference line and a vertical reference line;

a comparator for deriving an angular difference between the current angle and the preceding angle formed, by (a) a line segment connecting the threshold point and this preceding point and (b) one of a horizontal reference line and a vertical reference line; and a point filter for retaining the current point, in memory as a datum for the field if (a) the distance between the current point and the threshold point exceeds a threshold distance, (b) the angular difference exceeds threshold angular difference, or (c) the current point is the last point.

83. The system of claim 82, wherein the minimum distance applied by the threshold-point detector is about 0.03 inch (about 0.076 centimeters).

84. The system of claim 82, wherein the threshold distance applied by the point filter is about 0.40 inch (about 1.016 centimeters).

85. The system of claim 82, wherein the threshold angular difference applied by the point filter is about 30°.

86. The system of claim 82, wherein the point filter also retains as data for the field, if the angular difference exceeds a second threshold angular difference, both: (a) a point sampled immediately before the current point, and (b) a point sampled immediately after the current point.

87. The system of claim 86, wherein the second threshold angular difference applied by the point filter is about 45°.

88. The system of claim 75, wherein the receiver is a digitizer.

89. The system of claim 75, wherein the digitizer is integrated with the display.

90. The system of claim 75, wherein the data-entry device is a hand-held stylus.

* * * * *

UNITED STATES PATENT AND TRADEMARK OFFICE
CERTIFICATE OF CORRECTION

PATENT NO. : 5,926,567
DATED : July 20, 1999
INVENTOR(S) : Roger S. Collins

It is certified that error appears in the above-identified patent and that said Letters Patent is hereby corrected as shown below:

Column 1, line 65, delete "a";
Column 2, line 14, inset --or-- after "stroke";
Column 2, line 47, change "abovedescribed" to --above-described--;
Column 6, line 7, change "Iast-" to --last---;
Column 6, line 15, change "e" to --be--;
Column 8, line 18, change "systems" to --system--;
Column 9, line 1, change "referably" to --preferably--;
Column 9, line 59, delete "35";
Column 21, line 1, change "set;" to --set--;
Column 21, line 61, change "about:" to --about--;
Column 22, line 3, change "exceeds.a" to --exceeds a--;
Column 22, line 38, change "set," to --set--;
Column 24, line 8, change "formed," to --formed--;
Column 24, line 10, change "this" to --the--;

UNITED STATES PATENT AND TRADEMARK OFFICE
CERTIFICATE OF CORRECTION

PATENT NO. : 5,926,567

DATED : July 20, 1999

INVENTOR(S) : Roger S. Collins

It is certified that error appears in the above-identified patent and that said Letters Patent is hereby corrected as shown below:

```
Column 24, line 12,    change "point," to --point--;
Column 24, line 14,    insert --a-- after "exceeds".
```

Signed and Sealed this

Tenth Day of April, 2001

Attest:

NICHOLAS P. GODICI

*Attesting Officer*     *Acting Director of the United States Patent and Trademark Office*